United States Patent [19]

Morris

[11] 4,012,210
[45] Mar. 15, 1977

[54] GRANULAR GAS FILTER ARRANGEMENT

[75] Inventor: John M. Morris, Louisville, Ky.

[73] Assignee: Rexnord Inc., Racine, Wis.

[22] Filed: Feb. 23, 1976

[21] Appl. No.: 660,363

[52] U.S. Cl. .................................. 55/479; 55/487; 55/99

[51] Int. Cl.[2] ....................................... B01D 45/00

[58] Field of Search ............ 55/474, 479, 486, 487, 55/512, 98, 99; 210/263, 268, 291; 34/79, 82

[56] References Cited

UNITED STATES PATENTS

| 1,129,558 | 2/1915 | Dicke | 55/479 |
| 1,570,869 | 1/1926 | Thompson et al. | 55/474 |
| 2,580,635 | 1/1952 | Winter Jr. | 165/107 |
| 3,831,668 | 8/1974 | Weissenberg | 165/107 |

FOREIGN PATENTS OR APPLICATIONS

| 251,672 | 1929 | Italy | 55/479 |
| 216,675 | 6/1924 | United Kingdom | 55/479 |
| 879,216 | 10/1961 | United Kingdom | 55/474 |

*Primary Examiner*—Bernard Nozick
*Attorney, Agent, or Firm*—Edward M. Steutermann

[57] ABSTRACT

A continuous moving bed filter arrangement including a generally vertical vessel defining a gas cleaning chamber therein, having granular filter media inlet opening means located in the upper portion thereof, granular filter media outlet opening means located in the lower portion thereof, at least one first gas conduit means communicating with the upper end thereof, at least one plenum means surrounding a portion of the circumference of a segment of the vessel adjacent the lower portion of the vessel; at least one second gas flow conduit means to conduct gas between the plenum means and the gas cleaning chamber defined by the vessel; at least one third gas conduit means communicating with the plenum means; filter media inlet tube means extending downwardly from the media inlet opening a selected distance into the gas cleaning chamber defined by the vessel for selective admission of granular filter media to the chamber defined within the vessel whereby media flows downwardly through the vessel from the filter media inlet opening to the media outlet opening while gas flows between the first gas conduit means and the second gas conduit means through the bed of media flowing downwardly within the vessel.

9 Claims, 4 Drawing Figures

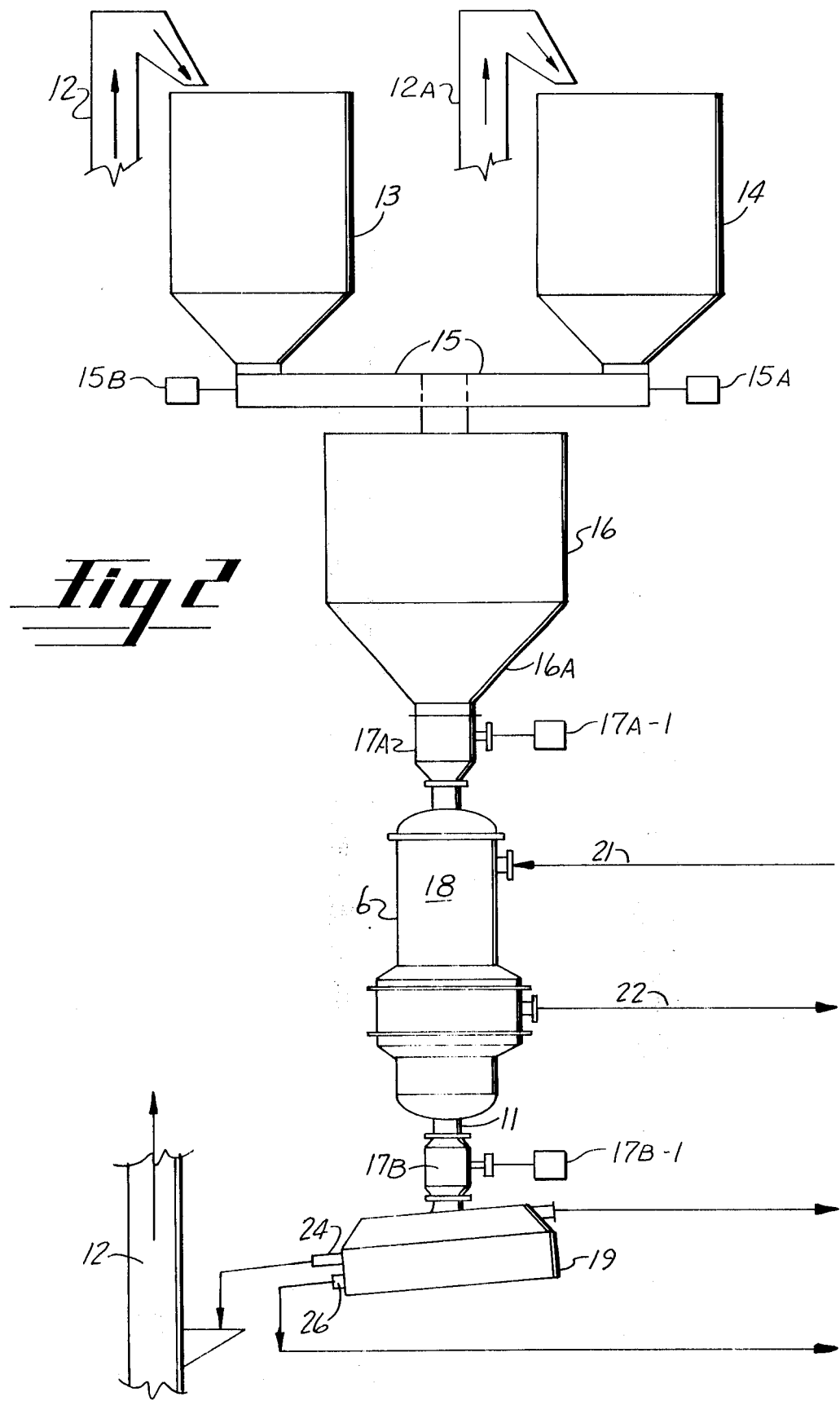

GRANULAR GAS FILTER ARRANGEMENT

BACKGROUND OF THE INVENTION

Numerous prior art arrangements are known for the filtration of dirty gas by passing the dirty gas through a bed of granular material, for example gravel.

In many applications, a fixed bed of gravel is used where the gas flows through the bed and particulate materials removed from the gas stream build up within the bed. Ultimately, the flow of gas in the cleaning direction is terminated and gas flow is reversed to remove the accumulated particulate material from the filter bed. Subsequently a new gas cleaning cycle is initiated.

Some other prior art arrangements provide means for utilization of a moving gravel bed filter where new media is continuously or intermittently added to the filter bed while a substantially equal portion of, presumably dirty, media which has accumulated substantial quantities of the particulate matter to be removed from the gas stream, is removed from the bed.

One such arrangment is shown in U.S. Pat. No. 3,716,969 Maeda where a bed of particulate matter flows downwardly through a filtering section while the gas stream is passed transversely through the media relative to the direction of the flow of media. Thomason, U.S. Pat. No. 1,570,869 shows a similar arrangement where a dirty gas is cleaned by passing the gas transversely through a downwardly moving bed of particulate media.

It is well known in the art, that in filtration of particulate materials from a gas stream the particulate material accumulates in the media to reduce the size of the openings between media granules and the most efficient cleaning occurs in such portions of the media bed where substantial quantities of particulate matter have acumulated inasmuch as the flow area provided by the interstices between the particulate filter material is reduced so small particles which pass through clean media are retained to improve the overall efficiency of removal of particulate material from the gas stream.

In general, known prior art moving bed arangements where gas flows transverse to the direction of media flow are less effective than arrangements where gas flows through the length of the bed, as provided by the present invention because in arrangements where the gas flows transversely through the media as the media flows through the filtration area, and particulate matter accumulates on the media to restrict flow of gas through the dirty areas of the media, gas flow is simply diverted to the cleaner portions of the moving media where removal efficiency is lower.

Therefore, in prior art arrangements where accumulation of particulate material on the moving media simply increases pressure drop through the portion of the media where the particulate matter has accumulated, and diverts gas flow to other, cleaner, areas of the media, the inherent advantage of the efficient cleaning which would occur in the dirtier portions of the media is lost.

SUMMARY OF THE INVENTION

The present invention provides a method and apparatus for use in removal of particulate matter from a dirty gas stream where the gas flow occurs in a direction parallel to the direction of flow of the media through the cleaning sections and where co-current or counter-current gas flow can be used. It is recognized that the present invention provides method and apparatus for selectively improving the efficiency of removal of particulate matter from the gas stream without the need to periodically reverse the flow of gas for regeneration of the media bed.

Additionally, the present invention provides a method and apparatus to control pressure drop through the media by simply increasing the rate of flow of media through the apparatus so the degree of particulate removal can be decreased where it is desirable to increase the rate of gas flow through the device.

Additionally, the present invention provides an arrangement wherein one or more stacked beds of media which can be of differing size can be provided in the cleaning section to provide alternate "course and "fine" cleaning areas by sequentially alternating the media introduced to the cleaning chamber. For example, the bulk of the filtration media can be composed of particulate material of one selected size and periodically zones of particulate matter of a different size can be introduced into the downward flowing media bed.

More particularly, the present invention provides a continuous moving bed filter arrangement and method including a generally vertical vessel defining a gas cleaning chamber therein, having a granular filter media inlet opening means located in the upper portion thereof, granular filter media outlet opening means located in the lower portion thereof, at least one first gas conduit means communicating with the upper end thereof, plenum means surrounding portion of the circumference of a segment of the vessel adjacent the lower portion thereof, at least one second gas flow conduit means communicating with the plenum means and the gas cleaning chamber defined by the vessel, at least one third gas conduit means communicating with the plenum means; inlet tube means to be cooperatively received by the media inlet opening to extend downwardly a selected distance into the gas cleaning chamber defined by the vessel for selective admission of granular filter media to the chamber defined within the vessel whereby the media flows downwardly through the vessel to the media outlet at a selected rate of flow while gas flows between the first gas conduit means and the second gas conduit means and through the media flowing downwardly within the vessel.

Various other features of the present invention will become obvious to those skilled in the art upon reading the disclosure set forth hereinafter.

BRIEF DESCRIPTION OF THE DRAWINGS

FIG. 2 is a schematic view showing one gas cleaning system using a gas cleaning device in accordance with the present invention.

Referring now to FIG. 1, a vessel 6, which can be a generally vertically disposed cylindrical vessel is provided to contain media to provide a bed for purification of a selected dirty gas stream. Vessel 6 can be constructed to withstand high temperature and pressure so that devices provided by the present invention can be adapted to be utilized in extreme applications. As shown, a cylindrical heat 2A can be provided to enclose the top of vessel 6 while a cylindrical head 2B can be provided at the bottom of vessel 6, Heads 2A and 2B, can be joined to vessel 6, for example, as shown, by means of cooperative flange pairs 4A and 4B.

Figure 1:
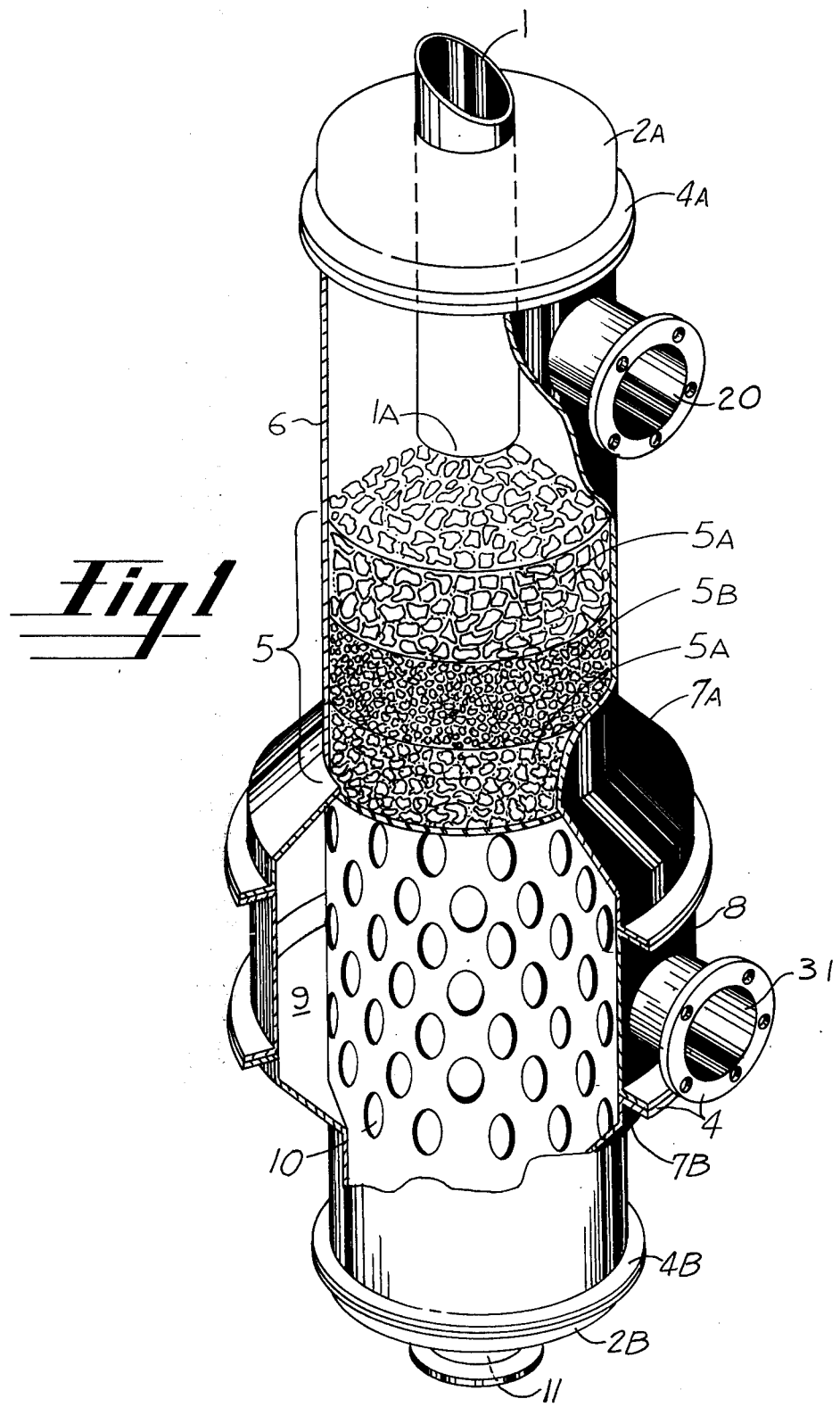
FIG. 1 is a view, in section, of one gas cleaning arrangement in accordance with the present invention.

A media inlet tube 1 can be provided in heat 2a for selectively introducing particulate filter media, as hereinafter described. Tube 1 extends downwardly into vessel 6 a selected distance and terminates in an outlet 1A where the location of outlet 1A determines the depth of bed 5 of particulate filter media is vessel 6.

Likewise, head 2B can be adapted to carry an outlet tube 11 for emission of particulate filter material from filter bed 5, also as hereinafter described.

In accordance with one feature of the present invention, a plenum chamber which in the example shown is defined by a ring 8 with cooperative adapters 7A, 7B can be provided around a portion of the circumference of vessel 6. Plenum chamber 9 defined by cooperative members 7A, 7B and 8 can, advantageously, be located toward the bottom of vessel 6. Apertures 10, as shown, are provided in the sides of vessel 6 to provide gas flow passageways communicating with vessel 6 in the area of the vessel covered by the plenum. A gas flow conduit 31 is provided to communicate with plenum chamber 9, as shown, and a second gas flow conduit means 5 is provided in the upper section of vessel 6 as shown. In the arrangement shown in the Figures, gas passageway 5 can, advantageously, be located above the media outlet 1A of media inlet tube 1.

Figure 3A:
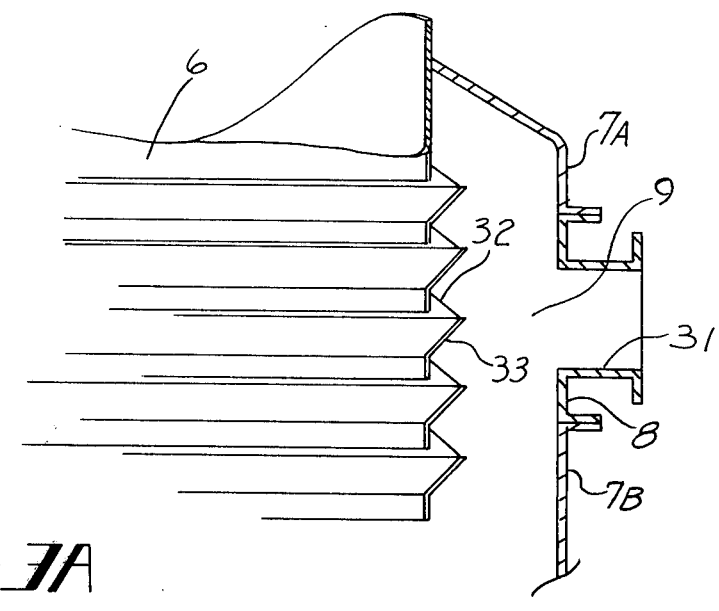
FIG. 3a and 3b illustrate two arrangements for gas flow conduits to the bed of filter media contained in the apparatus shown in FIG. 1.

Referring now to FIG. 3A which shows an alternative arrangement for gas flow passageway communicating with plenum 9 and vessel 6, cooperative louvers 33 are secured in stacked spaced relation by means (not shown but common in the art) to provide circular gas flow passageway to vessel 6 wherein gas flow passages 32 are defined between adjacent louvers to provide a gas flow passageway to and/or from the media bed disposed in vessel 6.

Figure 3B:
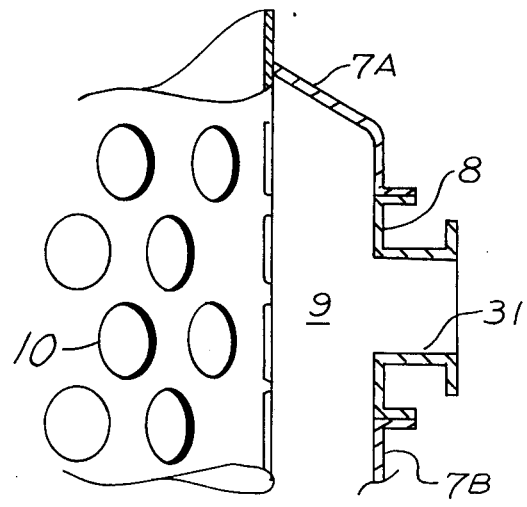

FIG. 3B is an enlarged illustration of the arrangement shown in FIG. 1.

Referring now to FIG. 2 which shows one application of an example of a device in accordance with the present invention, a gas cleaning device 6, for example as shown in FIG. 1, is provided to clean a dirty gas stream 21 and provide a clean gas outlet stream 22. A media elevator 12, for gravel for example, is provided to supply media to hoppers 13 and 14.

In accordance with one feature of the present invention media of different characteristics can be provided to the hoppers 13, 14 and can be alternatively introduced into vessel 6 for cleaning the dirty gas stream. Also, within the scope of the present invention, media of uniform size can be utilized in the device or, in applications wherein the dirty gas stream is to be chemically treated, a selected reagent can be introduced from one of the hoppers 13, 14 while the filter media is introduced from the other. A convey device 15, for example, a screw conveyor can be provided from each hopper 13, 14 to convey the media or other materials from hoppers 13, 14 to an intermediate hopper 16, which can also be provided as shown. In arrangements where a screw conveyor is provided to supply media to the cleaning device, as shown in FIG. 2, the relative amounts of each type media supplied can, for example, be controlled by control means 15A, 15B which regulate the period of time during which each screw conveyor is operated to supply the media to hopper 16.

Hopper 16, which can have a conical bottom 16a adapted to communicate with a feeder 17, can be provided for intermediate storage of media prior to introduction into gravel bed filter 18.

Various control means, not shown, can be provided to control the rate of flow of media into the gravel bed filter. Such arrangements can be operated in response to elapsed time, provide continuous rate of flow, or intermittent flow base on operating characteristics of the system. For example, a feeder lock 17A can be provided where operation of the feeder lock is controlled by a controller 17A-1 operating on the aforementioned basis. A second feeder 17b is provided to be connected to outlet 11 from gravel bed filter 6 and is provided to feed dirty media from filter 18 to a separator, for example a screen separator 19, as shown. The rate of flow of media from gravel bed filter 6 to separator 19, advantageously, approximates the rate of flow of media to the gravel bed filter, and is controlled by a cooperative controller 17B-1 which is adapted to operated feeder 17B. Separator 19 which can, for example, be a shaker screen, is provided to clean the media by removing the particulate material from the media. The cleaned media is emitted through an outlet 24 of screen 19 and is returned to hoppers 13 and 14 by means of conveyors 12 and 12A.

The particulate matter removed from the media is emitted from shaker 19 by means of outlet 26 and the particulate matter is disposed of, reprocessed or otherwise treated in accordance with the characteristics of the media and its value.

It will be recognized, that in instances where media of different size is used alternatively flowing through gravel bed filter 6, a shaker screen having capability of separating the two classes of media from the particulate material removed from the dirty air stream would be provided and the shaker screen would be provided with separate outlets for media which would be returned to hoppers 13 and 14 by means of elevators 12 and 12A. As previously described, filter arrangements in accordance with the present invention can be adapted to provide intermittent media flow or continuous media flow. Also, gas flow can be directed in either direction through media bed 5.

In operation, regardless whether media flow is intermittent or continuous, gas stream 21 is introduced to vessel 6 and, in the example shown in FIG. 2, flows downwardly through the media bed 5 provided by incoming media from hoppers 13 and 14. The gas flow downwardly through the bed travels substantially the entire length of the bed between the upper surface of the bed openings 10 in vessel 6. Outlets 10 can advantageously be of a diameter to prevent loss of media therethrough or whereas shown in Figure, large diameter openings are provided, the openings can be covered with gas pervious screens (not shown). Recognizing that accumulation of particulate matter in the media bed tends to decrease the size of the interstices between adjacent particles of filter media, the filtration efficiency improves with travel of gas through media bed 5. Therefore, in the example shown, in accordance with the present invention, the gas traveling through the entire bed is subjected to continually improving filtration efficiency for removal of smaller and smaller particles with travel.

Additionally, the rate of gas flow through any particular section of the media bed is essentially uniform so that there are very few areas of the bed (taken along a plane transverse to the longitudinal axis of the bed)

where the gas velocity is extremely high or extremely low.

In the example shown in FIG. 1, media of different characteristics, for example, different size distribution, can be utilized. For example, media 5A can be provided which is of a generally larger particle size than media 5B where layers of media 5A and 5B are alternated in vessel 6. In applications where charges 5A and 5B of media are alternately introduced to vessel 6, hopper 16 is usually eliminated so that the alternate layers of media are introduced directly to vessel 6 to form the media bed. In applications as illustrated in FIG. 1, the small particle size material of layers 5B is provided to remove small particulate material from the dirty gas stream.

In most applications for particulate removal, a quiescent or pushed bed is desired because the particulate material separated from the gas stream forms friable agglomerates which are broken by movement of the bed so some of the particles removed from the gas stream are re-entrained in the gas stream. Therefore, in such applications, filter arrangements are operated batchwise. That is, a charge of media 5 reaches introduced to vessel 6, the dirty gas stream is allowed to flow through the vessel until the media bed reches a predetermined particulate loading, then gas flow is terminated, the media charge is removed by means of outlet 11 through feeder lock 17B and a new charge is introduced to the vessel.

The media charge utilized in the operation can be of uniform size, distribution or layers of material of different particle size classification can be used. Also, selected reagents, for example lime for chemical removal of sulfur oxides, can also be utilized.

In most applications for treating gaseous inclusions such as $SO_x$ and $NO_x$, it is desirable to expose a maximum area of the material so a fluidized or semi-fluidized bed is desirable, gas flows upwardly through media bed 5 to achieve such fluidization and corresponding increased media surface area exposure.

Various other features of the present invention, within its scope of the invention is set forth in the claims appended hereto and will become obvious to those skilled in the art upon reading the disclosure set forth hereinbefore.

The invention claimed is:

1. A moving bed filter arrangement including:
   a. An enclosed generally vertical vessel defining a gas cleaning chamber, said vessel having granular filter media inlet means in the upper portion thereof and granular filter media outlet means in the lower portion thereof;
   b. at least one first gas conduit means communicating with the upper portion of said vessel;
   c. gas plenum means surrounding the periphery of the lower portion of said vessel;
   d. apertures in the sidewall of said vessel means communicating with the lower portion of said vessel and said plenum means;
   e. gas conduit means communicating with said plenum means;
   f. filter media inlet tube means extending into said vessel from said media inlet opening into said chamber for admission of filter media to said chamber; and,
   g. means to remove granular filter media from said vessel by means of said filter media outlet means; and
   h. a bed of granular filter media disposed within said vessel between said granular material inlet and outlet means.

2. The invention of claim 1 wherein said plenum chamber surrounds the entire periphery of said vessel along a selected length of said vessel along the longitudinal axis thereof.

3. The invention of claim 1 wherein said apertures includes selectively spaced aperture means of selected mean diameter located around the periphery of said vessel in the portion of said vessel surrounded by said plenum means.

4. The invention of claim 1 wherein said apertures includes multiple vertically stacked louver means providing gas passageway means between individual louver means.

5. The invention of claim 1 including dirty gas supply means cooperatively connected to said gas conduit means so that dirty gas flows through said gas conduit means to said apertures to said vessel and upwardly through said vessel for emission through said first gas conduit means.

6. The invention of claim 1 including dirty gas supply means cooperatively connected to said first gas conduit means so that dirty gas flows through said first gas conduit means and vertically downwardly through sid vessel to said apertures to said plenum means for emission through said third gas conduit means.

7. The invention of claim 1 including granular filter media supply means connected to supply granular filter media to said filter media inlet tube means to flow into said vessel to form said bed of filter media in said vessel.

8. The invention of claim 7 wherein said granular filter media supply means includes at least two sources of granular filter media of different characteristics to be selectively supplied to said vessel.

9. The invention of claim 7 wherein said granular filter media supply means includes control means to continuously supply granular filter media to said vessel and media outlet control means operatively connected to said media outlet means to control rate of emission of filter media from said vessel.

* * * * *